United States Patent [19]
Mitchell et al.

[11] Patent Number: 5,957,157
[45] Date of Patent: Sep. 28, 1999

[54] PILOT OPERATED PRESSURE/VACUUM VENT FOR A FUEL STORAGE TANK

[75] Inventors: Thomas O. Mitchell, St. Louis; Arthur C. Fink, Jr., Franklin, both of Mo.

[73] Assignee: Husky Corporation, Pacific, Mo.

[21] Appl. No.: 09/028,108

[22] Filed: Feb. 23, 1998

[51] Int. Cl.⁶ .................................................. B65D 51/16
[52] U.S. Cl. .................. 137/382; 137/493.7; 137/493.9; 137/526; 137/512.1; 137/512.5; 137/510; 137/492.5
[58] Field of Search .............................. 137/493.8, 493.9, 137/493.7, 493, 526, 512.5, 510, 512.1, 488, 377, 382, 492.5, 907, 484.4

[56] References Cited

U.S. PATENT DOCUMENTS

| | | | |
|---|---|---|---|
| 90,226 | 5/1869 | Boden | 137/493.8 |
| 165,119 | 6/1875 | Prosser | 137/512.5 |
| 169,805 | 11/1875 | Harrison | 137/493.8 |
| 1,460,900 | 7/1923 | Harris et al. | 137/510 X |
| 1,637,489 | 8/1927 | Kuhl | 137/493.8 X |
| 1,858,505 | 5/1932 | Jacobi | 137/510 X |
| 2,029,955 | 2/1936 | Taylor | 137/382 |
| 2,086,969 | 7/1937 | Strelow | 137/493.7 X |
| 2,152,422 | 3/1939 | Tokheim | 137/493.8 X |
| 2,168,891 | 8/1939 | Wiggins et al. | 137/493 X |
| 2,280,390 | 4/1942 | Ensign | 137/484.4 |
| 2,416,855 | 3/1947 | Clair | 137/492.5 X |
| 2,735,366 | 2/1956 | Hunter | 137/512.5 X |
| 2,971,531 | 2/1961 | Jurs et al. | 137/493.9 X |
| 3,386,468 | 6/1968 | Dickinson et al. | 137/493.9 X |
| 3,592,224 | 7/1971 | Bois | 137/493 X |
| 3,826,277 | 7/1974 | Bois | 137/493 |
| 4,616,763 | 10/1986 | Ruhl | 137/382 X |
| 4,716,922 | 1/1988 | Camp | 137/382 X |
| 5,054,511 | 10/1991 | Tuan et al. | 137/493.8 X |
| 5,419,366 | 5/1995 | Johnston | 137/493.7 |

*Primary Examiner*—Denise L. Ferensic
*Assistant Examiner*—Ramyar Farid
*Attorney, Agent, or Firm*—Paul M Denk

[57] ABSTRACT

A pressure/vacuum vent of the present invention is mountable to the vent pipe of a storage tank. The vent includes a valve housing having a wall defining a chamber which is in fluid communication with said storage tank. It includes a first valve responsive to an over-pressure condition of a first pressure, a second valve responsive to an over-pressure condition at a second pressure; and a third valve responsive to an under-pressure condition. The first and second pressures are different so that one valve will open at a small pressure and the other will open at a larger pressure. The first valve is a poppet valve, and the second and third valves are diaphragm valves. The valve housing is contained in a vent housing. The vent housing includes a floor through with a bottom stem of the valve housing extends and which has drain holes. A cover is mounted to a top portion of the valve housing to cover the vent housing. The cover is spaced from a top of the vent housing.

22 Claims, 6 Drawing Sheets

PILOT OPERATED PRESSURE/VACUUM VENT FOR A FUEL STORAGE TANK

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This invention relates to pressure vents for fuel storage tanks, and, in particular, to a pressure valve which is responsive to both high pressure and low pressure situations in a fuel storage tank.

Fuel storage tanks, such as tanks used to store gasoline at gas stations, are subject to varying pressures which can affect the ability of the fuel pumps to operate. The fuel storage tanks are thus provided with vents which allow excess pressure to be released when the tank exceeds a certain predetermined maximum pressure. Excess pressure can be caused by vacuum assist refueling when more vapors are drawn into the tank than fuel is dispensed, by not hooking up the vapor return hose to the transfer tank when refueling the tank, or by atmospheric conditions. In addition, negative pressure or partial vacuums can be created in the storage tank by dispensing more fuel than vapors that are drawn in (during vacuum assist refueling). In such a situation, the tank must be repressurized (i.e., the vacuum must be dissipated).

Typical vent devices use a direct acting poppet valve that is entirely effected by the pressure from the storage tank. Such vent devices use the same poppet valve to respond to over-pressure and under-pressure (vacuum) situations. Thus, there is only one pressure differential setting for the current vent devices. However, it is generally desirable to have a first pressure setting or differential to release excess pressure and a second pressure differential to release or dissipate a vacuum. It is also desirable to have at least two over-pressure settings to release vapors at a first pressure and at a second, higher pressure. However, current vents use the same valve to respond to both low and high pressure situations. Thus, the pressure at which the valves open are the same and often correlate to the lower pressure. This lower pressure leads to a seal which is not as tight as it could be. And, with typical vents, vibrations or minor imperfections on the sealing surface will open or create a leakage path through the poppet valve, and will prevent the vent from maintaining the required pressure in the storage tank.

BRIEF SUMMARY OF THE INVENTION

A primary object of the present invention is to provide a pressure/vacuum vent for a fuel storage tank.

Another object of the invention is to provide such a vent which uses separate valve assemblies to respond to over and under pressure situations.

A further object is to provide such a vent in which the separate valve assemblies are combined in a single housing.

Yet another object is to provide such a vent which will accurately control low pressure settings.

Another object is to provide such a vent which will substantially prevent leakage below the pressure setting of the valves.

These and other objects will become apparent to those skilled in the art upon a review of the following disclosure and accompanying drawings.

Briefly stated, a pressure/vacuum vent is provided which is mountable to a vent pipe of a storage tank. The vent has a valve housing having a wall defining a chamber which is in fluid communication with the storage tank through the vent pipe. The valve housing includes a first valve responsive to an over-pressure condition at a first pressure, a second valve responsive to an over-pressure condition at a second pressure; and a third valve responsive to an under-pressure condition. The first and second valves are each moveable from a closed position to an open position to dissipate excess pressure in the storage tank. The third valve is movable from a closed position to an open position to dissipate a partial vacuum in the storage tank. The first and second pressures at which the first and second valves open are different. Preferably, the first pressure is greater than the second pressure. The openings of the first and second valves are sized such that when the first valve is opened at its greater pressure, pent up gases or vapors can escape at a higher velocity than the second valve to more quickly dissipate the higher-pressure over-pressure condition. The use of two different valves for the two different over-pressure situations enables each valve to have its own set point or opening pressure. This allows for a proper seal for each valve, and the valves will not readily open due to vibrations or minor imperfections in the sealing surface.

The first valve comprises at least one, and preferably two, poppet valves. The poppet valves are biased to their closed positions by a spring. The poppet valves are mounted in openings in the wall of the valve housing. They include poppet valve bodies sized to seat against the opening to seal the opening when in the closed position. When the poppet valves are opened, the bodies move away (and preferably outwardly) from the valve body housing wall. That is, the excess pressure in the housing pushes the valve bodies outwardly against the force of the spring. Preferably, the poppet valves are positioned opposite from each other and the spring extends between the two poppet valves.

The second and third valves comprise diaphragm valves, which are identical to each other. For one to be responsive to an over-pressure condition and the other to be responsive to an under pressure condition, the valves are mounted in the housing oppositely from each other. That is, one faces inwardly and the other faces outwardly.

The diaphragm valves each include a valve body having a first high-pressure side and a second low-pressure side mounted in the valve housing. A diaphragm is mounted to the valve body first side in spaced relationship from a surface of the first side to define a diaphragm valve chamber. A first passage is formed in the valve body between the first and second sides of the valve body. The first passage opens into the diaphragm valve chamber to place the valve chamber in communication with the atmosphere on the second surface of the valve body. A second passage extends between the first and second sides of the valve body externally of the diaphragm valve chamber. A lever arm has a head portion which closes the second passage. The lever arm is operatively connected to the diaphragm such that movement of the diaphragm towards the valve body will pivot the lever arm to lift the lever head off the second passage to open the second passage. Movement of the diaphragm away from the valve body will pivot the lever arm to position the lever head over the second passage to close the second passage. A spring is positioned in the valve chamber to bias the diaphragm away from the valve body and hence to bias the lever to the second, closed, position.

The second valve is positioned so that its first high-pressure surface faces inwardly (i.e., the diaphragm is within the housing chamber) and the third valve is positioned such that its first high-pressure surface is external of the chamber (i.e., the diaphragm is external of the housing chamber).

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what I presently believe is the best mode of carrying out the invention.

Figure 1:
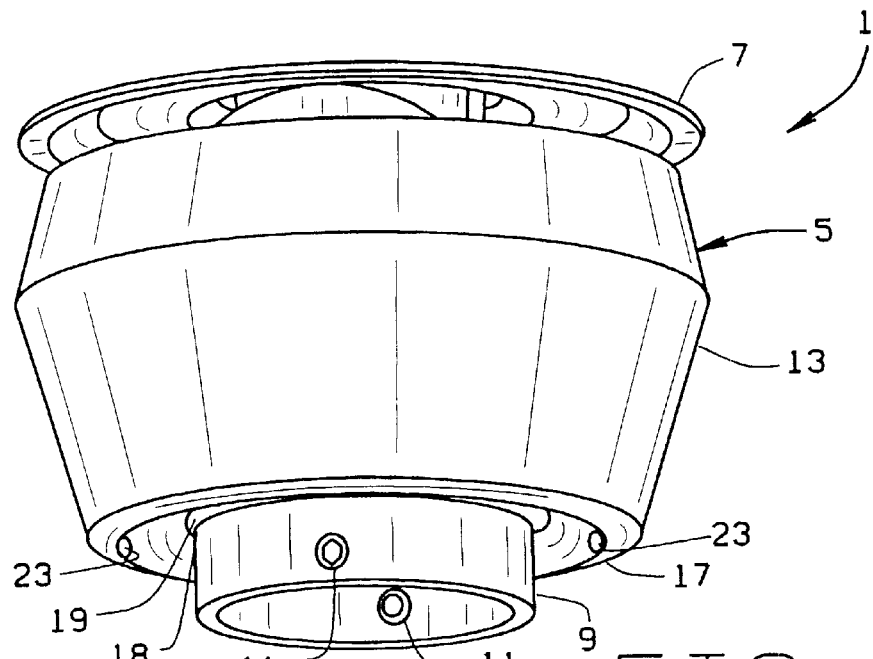
FIG. 1 is a perspective view of a pressure/vacuum vent of the present invention.
Figure 3:
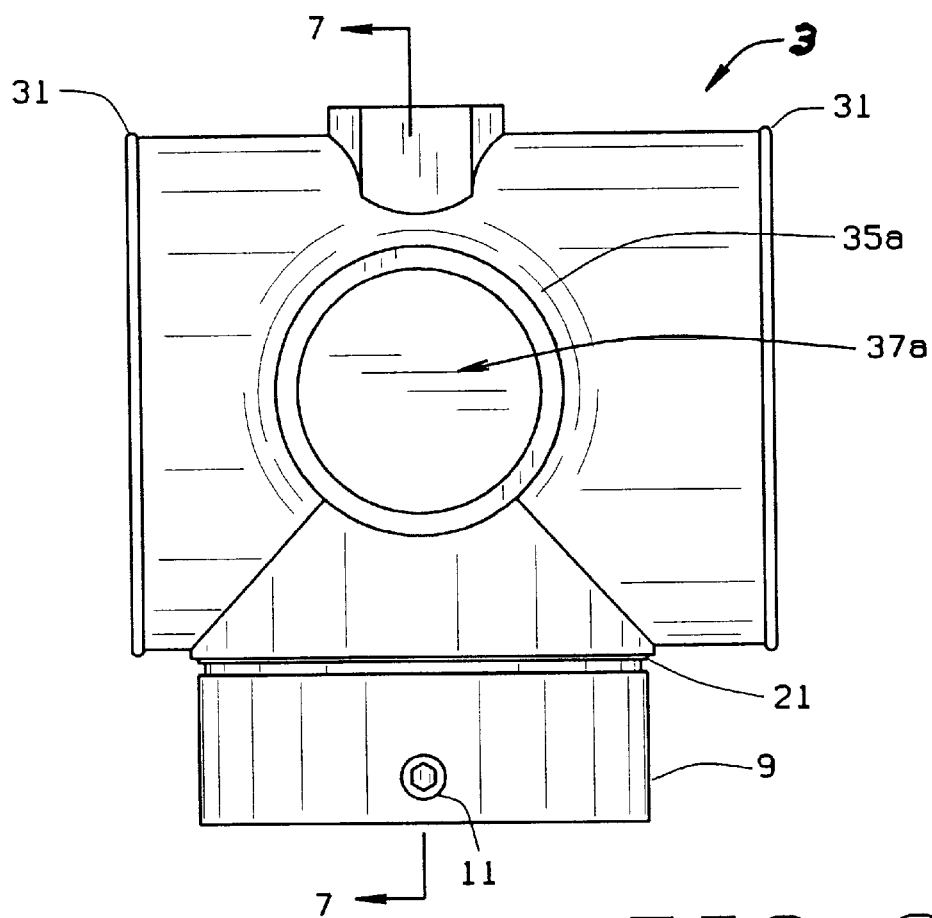
FIG. 3 is a side elevational view of a valve housing of the vent.
Figure 2:
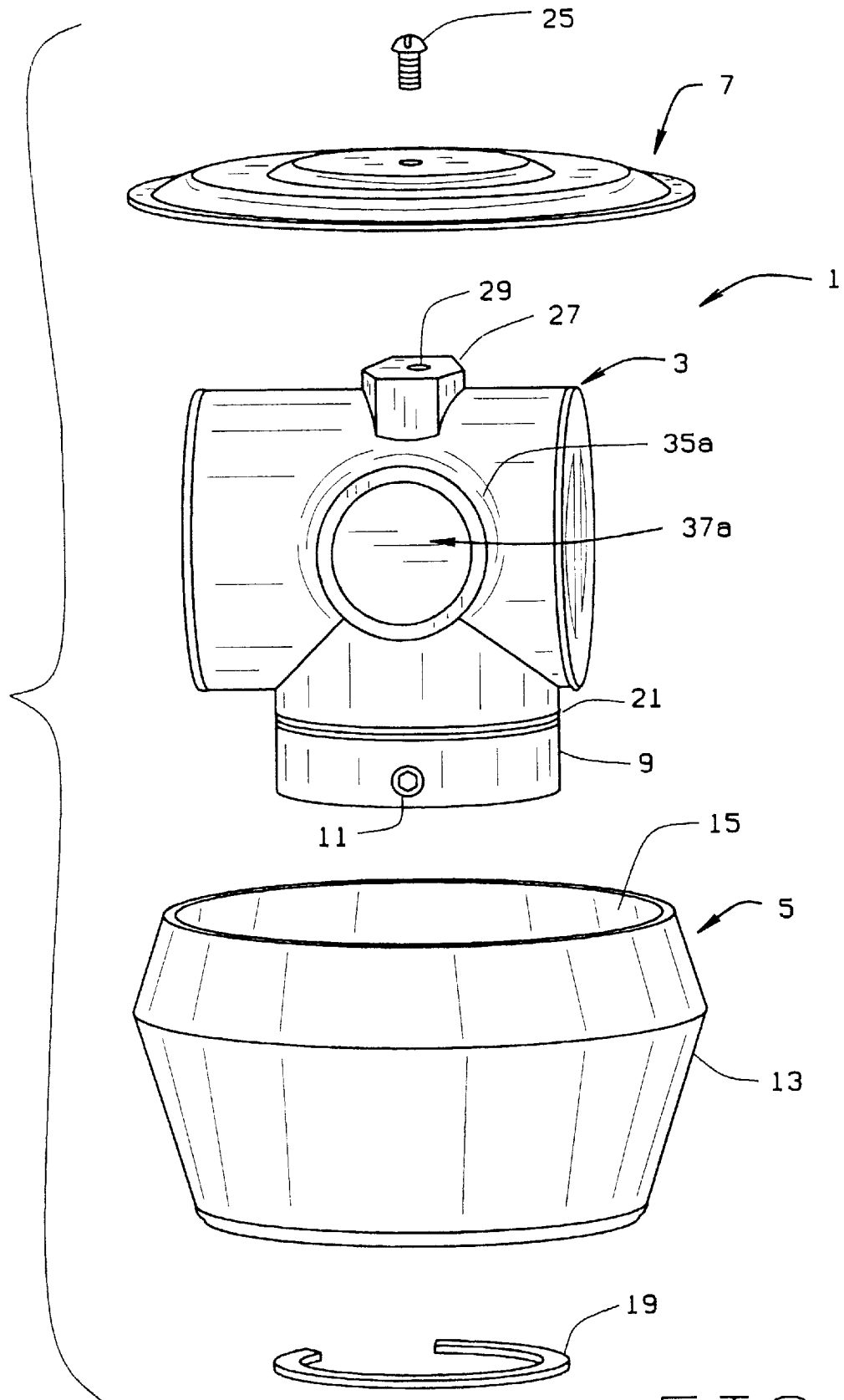
FIG. 2 is an exploded view of the vent.

A pressure vacuum vent 1 is shown generally in FIGS. 1 and 2. The vent 1 includes a valve housing 3, a vent housing 5, and a vent cover 7. The valve housing 3 is received in the vent housing 5 and includes a stem 9 which extends from the bottom of the vent housing 5. The stem 9 is sized to be placed over the vent pipe of a storage tank, and includes set screws 11 which extend through a bottom of the stem to secure the vent 1 to the vent pipe of the storage tank.

The housing 5 includes a side wall 13, an open top 15 through which the valve housing 3 extends (as seen in FIG. 1), and a bottom 17. The bottom 17 slopes upwardly and inwardly and has an opening 18 through which the valve housing stem 9 extends. A lock ring 19 is received in a groove 21 in the stem 9 to secure the valve housing 3 and vent housing 5 together. The vent housing opening 18 and the top of the valve housing stem 9 are sized relative to each other such that the valve housing stem 9 can only pass through the opening a determined amount. Thus, when the lock ring is placed in the stem groove 21, the vent housing 5 cannot be moved axially relative to the valve housing 3. The vent housing 5 also includes drain holes 23 in the lowest point of its bottom 17. As can be appreciated, moisture and gases will condense inside of the vent housing 5, and the drain holes 23 allow such condensate to escape the vent 1.

The vent cover 7 is secured to the top of the valve housing 3 by a screw 25. The valve housing 3 has a boss 27 at its top which has a screw hole 29 therein. As seen in FIG. 1, when the vent 1 is assembled, the vent cover 7 is spaced above the vent housing 5. As can be appreciated, pressure and vacuums from the storage tank are dissipated through the space between the vent cover 7 and the vent housing 5.

As noted above, the vent 1 must be responsive to both over-pressure and under-pressure (vacuum) situations in the storage tank. Preferably, in over-pressure situations, the vent opens at a low positive pressure to allow a small amount of vapors to be released, and will open at a higher pressure to allow for a greater release of pressure. In the first instance, the vent will preferably open at about 0.1 psi to release about 100 cfh (cubic feet per hour) of vapor. In the later instance, the vent will preferably open at about 1–2 psi to release about 7000 cfh of vapor.

Figures 4, 5:
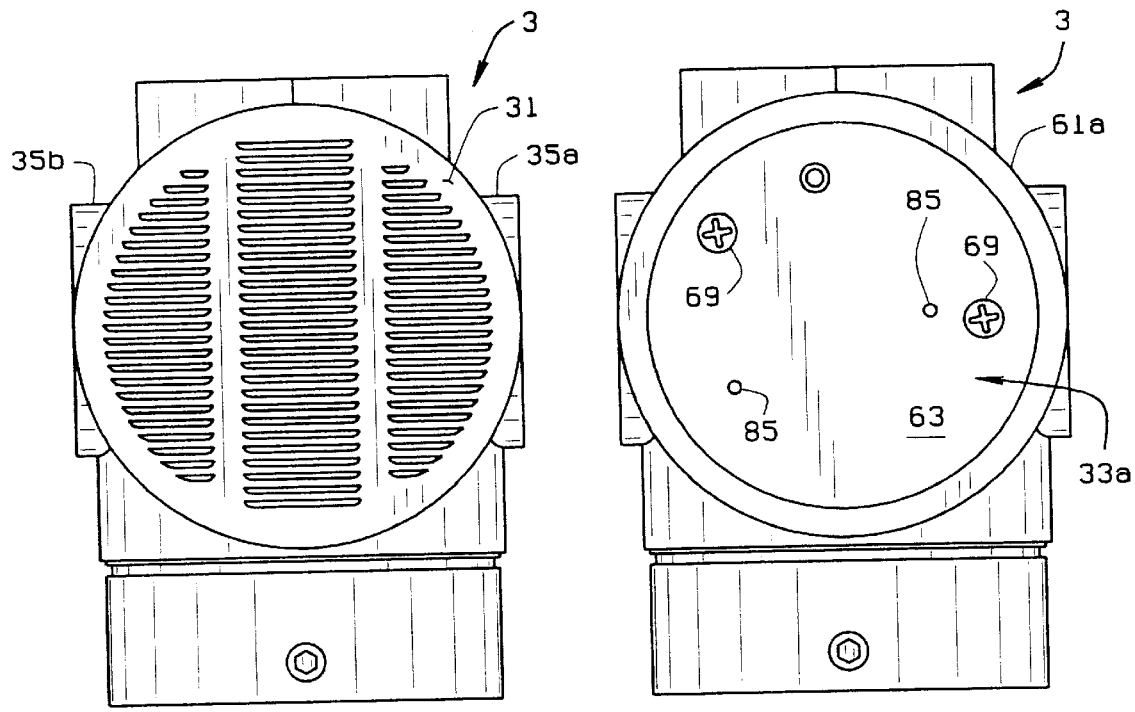
FIG. 4 is a side elevational view of the valve housing.
FIG. 5 is a side elevational view of one side of the valve housing with a vent cover removed to show a low pressure side of a diaphragm valve used in the vent.
Figure 6:
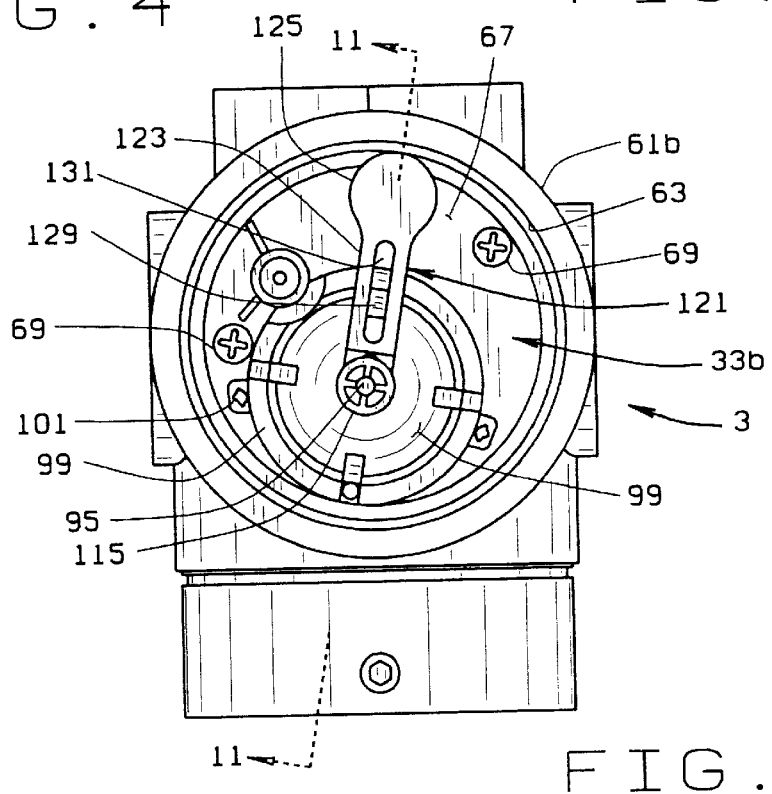
FIG. 6 is a side elevational view of the a side opposite that of FIG. 5 with a vent cover removed to show a high pressure side of another diaphragm valve used in the vent.
Figure 8:
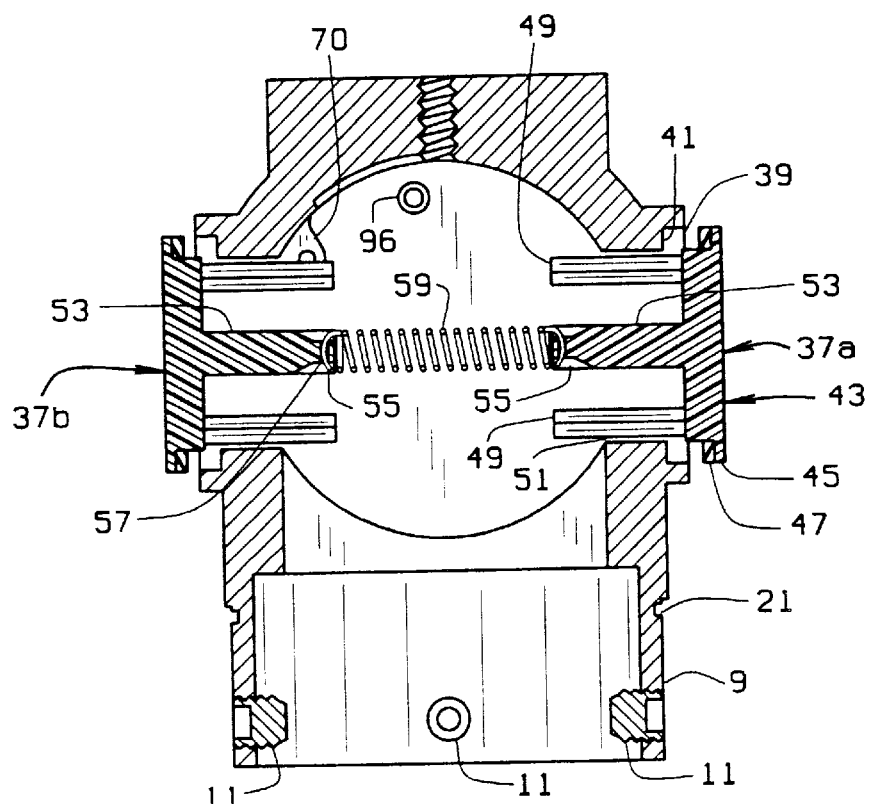
FIG. 8 is a cross-sectional view similar to that of FIG. 7, but with the poppet valve opened.
Figure 9:
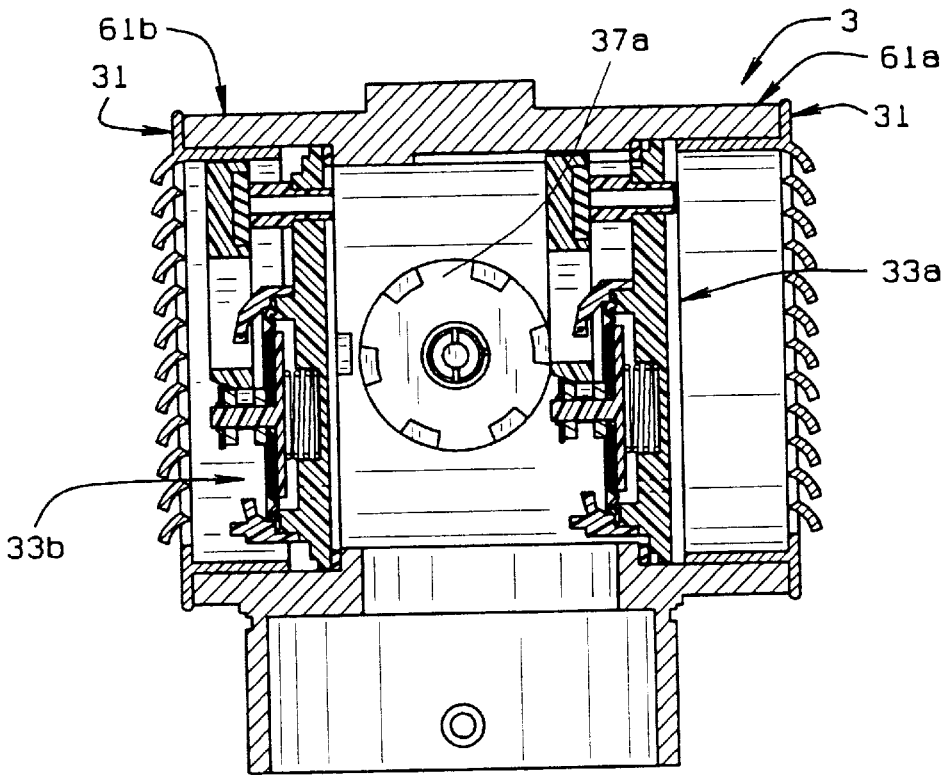
FIG. 9 is a cross-sectional view of the vent showing the diaphragm valves in a closed position.

As seen in FIG. 9, the valve housing 3 is has a cylindrical body with two opposing extensions 61a,b giving the housing 3 essentially a T-shape. The opposite ends of the "T" have louvered vent covers 31 which cover identical, but oppositely positioned diaphragm valves 33a,b. The generally vertical sides (as seen in FIGS. 4 and 5) have small projections 35a,b which house poppet valves 37a,b. (FIGS. 7 and 8)

Figure 7:
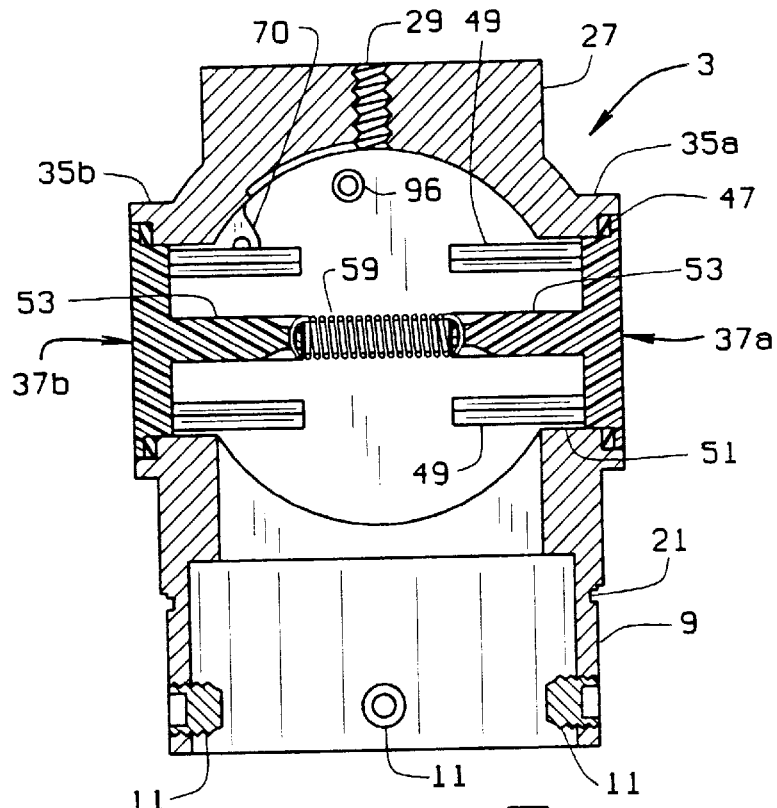
FIG. 7 is a vertical cross-sectional view of the valve housing taken along line 7—7 of FIG. 3 showing the poppet valves of the vent in a closed position.

Turning to FIGS. 7 and 8, the projections 35a,b have openings 39 having an inwardly extending shoulder 41 spaced inwardly from the outer surface of the projections 35a,b. The poppet valves 37a,b are identical and include a valve body 43 sized to pass through the shoulder 41. A flange 45 extends from the body 43 which is sized to be received in the opening 39 to seat against the shoulder 41 when the valve is closed, as shown in FIG. 7. A gasket 47 is positioned on an inner surface of the flange to create a seal between the valves 37a,b and the shoulders 41 when the valves are closed. The valves 37a,b further includes legs 49 which extend inwardly from the back or inner surface of the valve bodies 43. There are preferably six legs 49 which are positioned to ride along the inner surface 51 of the shoulder 41. More legs or fewer legs could be provided, if desired. The legs 49 maintain the valve 37a,b generally centered with respect to the openings 39 so that the valves may move between their closed (FIG. 7) and opened (FIG. 8) positions. The valves 37a,b each also include a central leg 53 extending inwardly from the center of the valve bodies 43. The legs 53 each have a rod 55 at their inner ends through which a radial bore 57 extends. The legs 53, and hence the two valves 37a,b, are connected together by a spring 59, the ends of which pass through the bores 57 in the leg rods 55.

As can be appreciated, the spring 59 normally pulls the valves 37a,b to their closed position, as shown in FIG. 7. However, when pressure builds up in the valve housing 3, the pressure in the valve housing will cause the valve bodies 43 to unseat and become spaced from the shoulders 41, such that the valves will be in an opened position, as seen in FIG. 8. These poppet valves are responsive to high pressure conditions within the valve housing 3 (and hence within the storage tank). Preferably, the force of the spring 59 will not be overcome, and hence the valves 37a,b will not open, until the pressure in the storage tank exceeds a predetermined pressure of about 1–2 psi. When the valves 37a,b open, they will vent about 7000 cfh of vapor at about 2 psi to reduce the pressure in the storage tank to its normal condition. Once the pressure in the tank returns to normal, the valve bodies 43 will be pulled back to their closed positions by the spring 59. Although two poppet valves are shown, the vent 1 would operate with only one poppet valve to relieve higher pressure situations. In this case, the spring 59 would be mounted to an inner surface of the valve housing 3, rather than to the opposing poppet valve.

Figure 10:
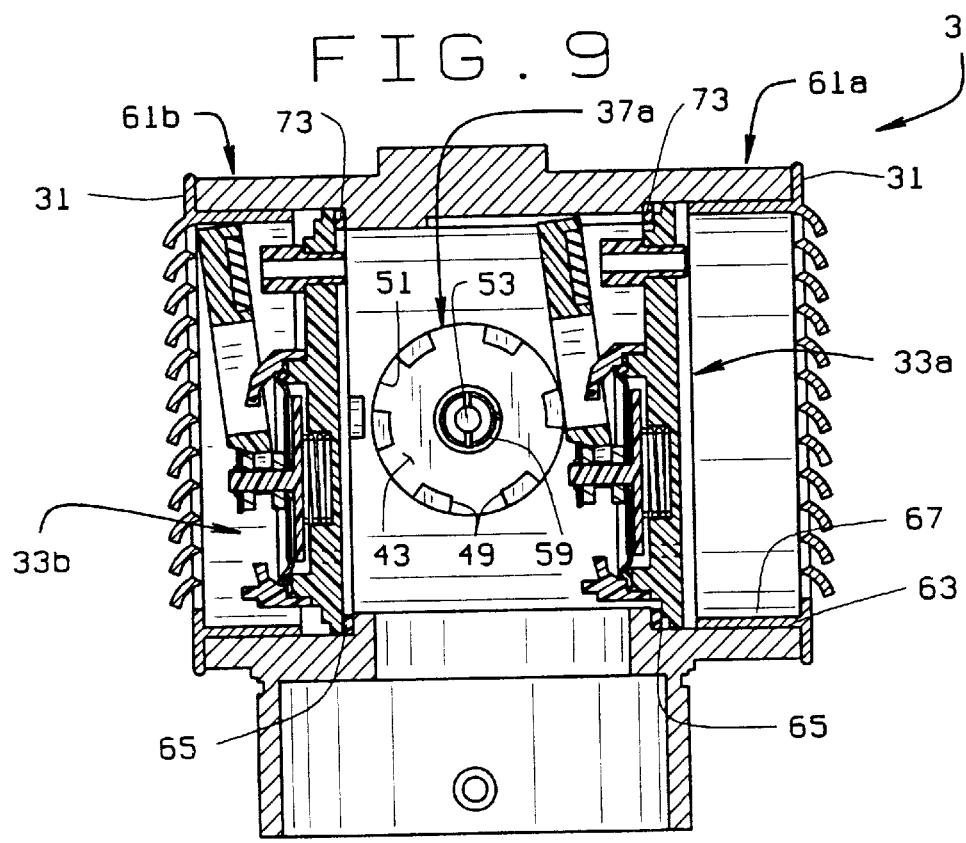
FIG. 10 is a cross-sectional view similar to that of FIG. 9, but with the diaphragm valves in an open position (both valves are shown open for illustrative purposes only, in practice, this condition would not occur)
Figure 11:
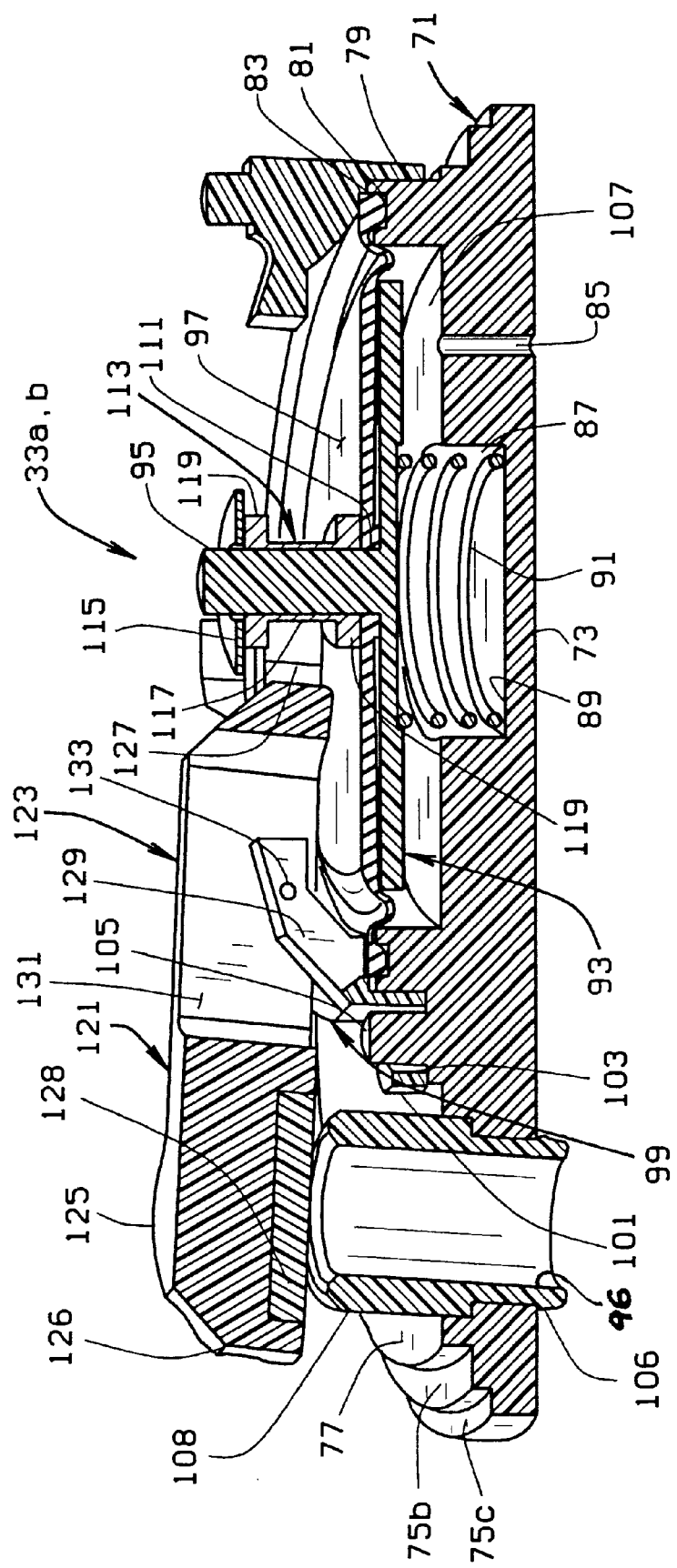
FIG. 11 is a cross-sectional view of the diaphragm valve taken along line 11—11 of FIG. 6.

The diaphragm valves 33*a,b* are shown in FIGS. 9–11. The two diaphragm valves are identical in construction. However, as seen in FIGS. 9 and 10, the valve 33*a* faces inwardly to compensate for low over-pressure situations, and the valve 33*b* faces outwardly to compensate for under-pressure (vacuum) situations.

The opposite extensions 61*a,b* of the valve housing 3 define outwardly extending cylinders having openings 63 and shoulders 65 at their inner ends. The vent covers 31 each have an inwardly extending circular wall 67 which is sized and shaped to be slidingly received in the openings 63. The covers 31 have an over-all diameter which is larger than the openings 63 and are about equal in size and shape to the cylinders 61*a,b*. Thus, the covers 31 sit against the outer surfaces of the cylinders 61*a,b* and are held in place by a frictional contact between the cover walls 67 and the walls of the cylinders 61*a,b*. The diaphragm valves 33*a,b* sit against the shoulders 65 and are fixed to the valve body by a pair of screws 69 which extend through bodies of the diaphragm valves (as discussed in more detail below) and into bosses 70 (FIGS. 7 and 8) on the inner surface of the valve housing. A sealing ring 73 is positioned between the diaphragm valves and the shoulder 65 to form a fluid tight seal.

The diaphragm valves 33*a,b* each include a body 71 having an outer periphery sized and shaped to be received in the cylinders 61*a,b*. The body 71 has a first low pressure surface 73 which forms an outer surface for valve 33*a* and an inner surface for valve 33*b*. The periphery is stepped, as at 75*b,c* to define a pair of steps which lead to a second surface 77 opposite the surface 73. The second high pressure surface 77 forms the outer surface for the valve 33*b* and the inner surface for the valve 33*a*.

A circular wall 79 extends upwardly (with reference to FIG. 11) from the second surface 77 and has a groove 81 formed in its top surface 83. The wall 79 has a diameter smaller than the diameter of the body 71 and is radially offset from the center of the body 71 such that the wall 89 is adjacent the edge of the surface 77. A pair of passages 85 (FIGS. 5 and 11) extends between the first surface 73 and the second surface 77 and opens up inside of the wall 79. A circular bore or well 87 having a floor 89 is formed in the center of the wall 79. A spiral spring 91 sits on the well floor 87 and extends above the body second surface 77. A support plate 93 having a centrally located rod 95 sits on the spring 91 within the wall 79. The support plate 93 has a diameter that is smaller than the diameter of the wall 79.

A diaphragm 97 is placed over the support plate 93. The diaphragm 97 has a circumference which is sized and shaped to correspond to the circumference of the wall 79 and the edge of the diaphragm 97 is received in the groove 81 of the wall 79. A mounting ring 99 extends around and over the wall 79 and the edge of the diaphragm 97 to hold the diaphragm in place on the wall 79. The ring 99 has ears 101 which extend outwardly from a side wall of the ring. The ears 101 have holes 103 which are journaled about posts 105 on the body second surface 77. The posts 105 are headed over and preferably melted to fix the mounting ring 99 (and hence the diaphragm 97) to the diaphragm body 71. As can be appreciated, the diaphragm 97, the wall 79, and the body second surface 77 cooperate to define a diaphragm valve chamber 107.

A second passage 106 extends through the diaphragm body 71 outside of the wall 79 near an edge of the valve body 71. A hollow sleeve 108 is fixed in the passage 106 to extend above the second surface 77. The center of the sleeve 106 and the wall 79 lie on the same diameter of the valve body 71. Thus, the second passage 106 is spaced approximately 180° from the point where the wall 79 is adjacent the edge of the valve body 71.

The diaphragm 97 has a centrally located hole 111 through which the support plate rod 95 extends. A sleeve 113 is placed about the rod 95 and is held in place by a lock washer 115. The sleeve 113 has a sleeve body 117 and upper and lower flanges 119. The lock washer 115 essentially sits on the upper flange 119.

A vent lever 121 is pivotally mounted on the valve body 71 to cover the second passage sleeve 108. The lever 111 has an arm 123 having a head 125 at one end and a slot 127 at the other. The head 125 has a bore 126 formed therein in which a resilient member 128 is fixed. The slot 127 is sized to fit around the sleeve 113 between the flanges 119. The diaphragm mounting ring 99 includes an arm 129 in the path of the lever arm 123. The lever arm 123 includes a slot 131 sized to fit over the mounting ring arm 129. The mounting ring arm 129 includes a bore 133 through which a pivot pin (not shown) extends. The pin passes through the lever arm 123 and the mounting ring arm 129 to define a pivot point for the lever arm. Thus, when the diaphragm 97 is acted upon to compress the spring 91, the diaphragm 97 will push the mounting plate 93 downwardly (with reference to FIG. 11) which will cause the end of the lever arm 123 to move downwardly. This in turn, will cause the lever head 125 to lift off the sleeve 108 which extends through the second passage 106 to open the passage 106, and to thereby place the interior of the valve housing 3 in fluid communication with the exterior of the valve housing 3.

As seen in FIG. 11, the lever arm 123 is sized such that the resilient material 128 of lever head 125 is positioned over the second passage sleeve 108. The upper surface of the sleeve 108 is chamfered. The spring 91 normally biases the supporting plate 93 upwardly to normally bias the lever head 125 against the sleeve 108. The reinforced contact of the chamfered upper surface of the sleeve 108 with the resilient material 128 in the head 125 will seal the sleeve closed.

The valve chamber 107 is placed in communication with the atmosphere on the opposite (low pressure) side of the body 71 through the passages 85. This communication between the valve chamber 107 and the atmosphere enables the high pressure side of the diaphragm to overcome the force of the spring 91 such that the arm 121 will pivot to uncover the passage 96 to correct for under pressure or over pressure situations, as discussed above. As noted above, the valves are all sealed, and thus, the interior of the valve housing 3 (which is in communication with the storage tank through a vent pipe) is normally sealed from the ambient conditions. When the pressure within the chamber 107 drops below the pressure acting on the interior of the housing 3, the diaphragm 97 of valve 33*a* will be urged towards the valve body 71 to compress the spring 91. This will cause the lever head 125 to lift off the second passage sleeve 108 to open a path of communication between the interior of the valve housing 3 and the exterior of the valve housing. Conversely, when the pressure within the chamber 107 is less than the pressure acting on the exterior of the housing 3, the diaphragm 97 of valve 33b will be urged towards its valve body 71 to compress its spring 91. This will cause the lever head 125 of the valve 33b to lift off the second passage sleeve 108, opening a path of communication between the interior and exterior of the valve housing 3. When one of the valves 33a,b is opened by the appropriate pressure condition, the pressure within the chamber will begin to equilibrate with the pressure outside of the valve housing 3. When the pressure differential is sufficiently small, the force of the spring 91 will push against the support plate 93 to close the sleeve 108, and hence the passage 106.

As can be appreciated, the single vent 1 will accommodate both over-pressure and under-pressure conditions. Additionally, the vent 1 will be responsive to both low and high pressure conditions. The ability to respond individually to low and high pressure differences will allow for a quick depressurization in the case of a high pressure condition, and will prevent undue build up of pressure with in the tank in the case of a low pressure condition. Further, it enables the dissipation of a vacuum which can form in the tank without the need to resort to a second vent pipe from the tank. Obviously, more than one vent can be used, as necessary to properly vent a storage tank.

In view of the above, it will be seen that the several objects and advantages of the present invention have been achieved and other advantageous results have been obtained. As various changes could be made in the above constructions without departing from the scope of the invention, it is intended that all matter contained in the above description or shown in the accompanying drawings shall be interpreted as illustrative and not in a limiting sense.

We claim:

1. A pressure/vacuum vent mountable to a vent pipe of a storage tank, the vent having a valve housing having a wall defining a chamber which is in fluid communication with said storage tank and including at least one valve responsive to an over-pressure condition in the tank to vent excess pressure, and at least one valve responsive to, an under-pressure condition in the tank to dissipate a vacuum in the tank, the valve responsive to the under-pressure condition comprises a diaphragm valve, said diaphragm valve including a vent housing, a valve body mounted in the vent housing, the valve body having a fist side and second side, a diaphragm mounted to the valve body first side in spaced relationship from a surface of the first side to define a diaphragm valve chamber, a mechanical spring located in said diaphragm valve chamber, a first passage in the valve body extending between the first and second sides of said valve body, said first passage opening into said diaphragm valve chamber, a second passage extending between said first and second sides of the said valve body externally of said diaphragm valve chamber, and a lever arm having first and second end portions, said lever second end portion closes said second passage, and said first end portion defining a pivot point to effect lever movement, said lever arm being operatively connected to said diaphragm and arranged externally of said diaphragm valve chamber, such that movement of said diaphragm in a first direction will lift said lever arm off said second passage, and movement of said diaphragm in a second and opposite direction will return said lever arm to said second passage such that said, lever arm covers said second passage.

2. The pressure/vacuum vent of claim 1 wherein said lever arm is biased towards said second passage.

3. The pressure/vacuum vent of claim 2 wherein said diaphragm valve includes a pressure plate in said diaphragm valve chamber and a spring positioned between said pressure plate and a floor of said diaphragm valve chamber, said spring biasing said pressure plate, and hence said diaphragm, away from said diaphragm valve body to bias said lever arm towards its second passage.

4. The pressure/vacuum vent of claim 3 wherein said valve body includes a second surface, and said second surface is directed inwardly relative to said valve housing chamber.

5. The pressure/vacuum of claim 1 wherein said at least one valve responsive to said over-pressure condition comprises a poppet valve, said valve being mounted in an opening in said valve housing and having a poppet valve body sized to seat against said opening;
said valve being movable from a first position wherein said poppet valve body is seated to seal said opening and a second position in which said poppet valve body is spaced from said valve housing wall in response to an over-pressure condition to allow excess pressure to be dissipated.

6. The pressure/vacuum vent of claim 5 wherein said at least one poppet valve is biased to said first closed position.

7. The pressure/vacuum vent of claim 6 wherein said at least one valve responsive to said over-pressure condition includes a second poppet valve.

8. The pressure/vacuum vent of claim 7 wherein said second poppet valve is positioned oppositely from said first poppet valve.

9. The pressure/vacuum vent of claim 8 wherein said first and second poppet valves are connected by a spring which extends between said poppet valves, said spring biasing each said poppet valves to said closed position.

10. The pressure/vacuum vent of claim 5 wherein said at least one valve responsive to said over-pressure condition further includes a diaphragm valve, said diaphragm valve being movable between a closed position and an open position.

11. The pressure/vacuum vent of claim 10 wherein said diaphragm valve is moved to its said open position at a pressure less than the pressure required to open said poppet valve.

12. The pressure/vacuum vent of claim 10 wherein the diaphragm valve includes a vent housing, a diaphragm valve body mounted to the vent housing;
the diaphragm valve body having a first side and a second side, a diaphragm mounted to the diaphragm valve body first side in spaced relationship from a surface of the first side to define a diaphragm valve chamber;
a first passage in the valve body extending between the first and second sides of said valve body, said first passage opening into said diaphragm valve chamber;
a second passage extending between said first and second sides of said diaphragm valve body externally of said diaphragm valve chamber;
and a lever arm having a portion which closes said second passage;
said lever arm provided externally of said diaphragm valve chamber and being operatively connected to said diaphragm such that movement of said diaphragm in a first direction will lift said lever off said second passage, and movement of said diaphragm in a second and opposite direction will return said lever to said second passage such that said lever covers said second passage.

13. The pressure/vacuum vent of claim 12 wherein said lever arm is biased towards said second passage.

14. The pressure/vacuum vent of claim 13 wherein said diaphragm valve includes a pressure plate in said diaphragm valve chamber and a spring positioned between said pressure plate and floor of said diaphragm valve chamber, said spring biasing said pressure plate, and hence said diaphragm away from said diaphragm valve body to bias said lever arm towards its second passage.

15. The pressure/vacuum vent of claim 14 wherein said valve body includes a first surface, and said first surface is directed inwardly relative to said valve housing chamber.

16. The pressure/vacuum vent of claim 1, wherein said first valve comprises two poppet valves, said poppet valves being biased to their closed position.

17. The pressure/vacuum vent of claim 16 wherein said poppet valves are operatively connected by a spring which extends between said poppet valves.

18. A pressure/vacuum vent mountable to a vent pipe of a, storage tank, the vent having a valve housing having a wall defining a chamber which is in fluid communication with said storage tank, and including a first valve responsive to an over-pressure condition of a first pressure, a second valve responsive to an over-pressure condition at a second pressure, said first and second valves comprising poppet valves, and said poppet valves being biased to a closed position, and a third valve responsive to an under-pressure condition, said first and second valves each being movable from a closed position to an open position to dissipate excessive pressure in said storage tank, said third valve being a diaphragm valve, said diaphragm valve including a vent housing, a valve body mounted in the vent housing, the valve body having a first side and second side, a diaphragm mounted to the valve body first side in spaced relationship from a surface of the first side to define a diaphragm valve, chamber, a mechanical spring located in said diaphragm valve chamber, a first passage in the valve body extending between the first and second sides of said valve body, said first passage opening into said diaphragm valve chamber, a second passage extending between said first and second sides of said valve body externally of said diaphragm valve chamber, and said third valve being movable from a closed position to an open position to dissipate a vacuum in said storage tank, and a lever arm having first and second portions, said lever arm's second end portion closes said second passage, and said first end portion defining a pivot point to effect lever movement, said lever arm being operatively connected to said diaphragm and arranged externally of said diaphragm valve chamber, such that movement of said diaphragm in a first direction will lift said lever arm off of said second passage, and movement of said diaphragm in a second and opposite direction will return said lever arm to said second passage such that said lever arm covers said second passage, said first and second pressures are different, said first pressure being greater than said second pressure, said first valve enabling greater rat of escape of gases when in its opened position than des said second valve, the pressure/vacuum vent including a vent housing, said valve housing being received in said vent housing, said vent housing including a side wall and a bottom wall, said bottom wall having an opening therein through which a bottom portion of said valve housing extends, said bottom wall sloping downwardly towards its side wall, and having drain holes therein.

19. The pressure/vacuum vent of claim 18 wherein said second and third valves comprise diaphragm valves.

20. The pressure/vacuum vent of claim 19 wherein said second and third valves are identical;

said second and third valves each having a body comprising a high pressure side and a low pressure side, where said low pressure side of said second valve is disposed outwardly relative to said housing and said low pressure side of said third valve is disposed inwardly relative to said housing.

21. The pressure/vacuum vent of claim 18 wherein said vent housing an open top, said vent including a cover which is spaced above said open top of said vent housing.

22. The pressure/vacuum vent of claim 21 wherein said vent housing cover is mounted to a top portion of said valve housing;

said valve housing top portion extending above said vent housing open top.

\* \* \* \* \*

UNITED STATES PATENT AND TRADEMARK OFFICE
CERTIFICATE OF CORRECTION

PATENT NO. : 5,957,157
DATED : September 28, 1999
INVENTOR(S) : Mitchell, T.O., and
Fink, A.C., Jr.

It is certified that error appears in the above-indentified patent and that said Letters Patent is hereby corrected as shown below:

Column 7, claim 1, line 43, change "fist" to ---first---.

Column 10, claim 18, line 12, change "rat" to ---rate---.

Column 10, claim 18, line 13, change "des" to ---does---.

Signed and Sealed this

Thirtieth Day of May, 2000

Attest:

Attesting Officer

Q. TODD DICKINSON

Director of Patents and Trademarks